US011205081B2

(12) United States Patent
Mandai et al.

(10) Patent No.: US 11,205,081 B2
(45) Date of Patent: Dec. 21, 2021

(54) ARITHMETIC APPARATUS

(71) Applicant: CLARION CO., LTD., Saitama (JP)

(72) Inventors: Kohei Mandai, Tokyo (JP); Takehito Ogata, Tokyo (JP); Yongdok Ri, Saitama (JP)

(73) Assignee: CLARION CO., LTD., Saitama (JP)

( * ) Notice: Subject to any disclaimer, the term of this patent is extended or adjusted under 35 U.S.C. 154(b) by 39 days.

(21) Appl. No.: 16/776,165

(22) Filed: Jan. 29, 2020

(65) Prior Publication Data
US 2020/0242372 A1 Jul. 30, 2020

(30) Foreign Application Priority Data

Jan. 30, 2019 (JP) .............................. JP2019-014740

(51) Int. Cl.
*G06K 9/00* (2006.01)
*B62D 6/00* (2006.01)
*G06K 9/62* (2006.01)

(52) U.S. Cl.
CPC ......... *G06K 9/00798* (2013.01); *B62D 6/006* (2013.01); *G06K 9/6232* (2013.01)

(58) Field of Classification Search
CPC ............. G06K 9/00798; G06K 9/6232; G06K 9/4652; G06K 9/4671; G06K 9/00805; G06K 9/00791; G06K 9/00288; G06K 9/00348; G06K 9/00228; G06K 9/3241; G06K 9/4604; G06K 9/4609; G06K 9/4638; B62D 6/006; G01S 7/4808; G01S 17/42; G01S 17/931; G01S 17/86; G01S 17/89;

(Continued)

(56) References Cited

U.S. PATENT DOCUMENTS

2004/0024498 A1* 2/2004 Okamura ................ G01S 7/412
701/1
2010/0098297 A1* 4/2010 Zhang .................. G06K 9/4652
382/104

(Continued)

FOREIGN PATENT DOCUMENTS

| CN | 108 519 605 A | 9/2018 |
|----|---------------|--------|
| EP | 2 390 745 A1 | 11/2011 |
| WO | WO 2015/102096 A1 | 7/2015 |

OTHER PUBLICATIONS

European Extended Search Report dated Jun. 26, 2020 issued in counterpart European application No. 20154329.5, pp. 1-8.

*Primary Examiner* — Nimesh Patel
(74) *Attorney, Agent, or Firm* — Lewis Roca Rothberger Christie LLP

(57) ABSTRACT

An arithmetic apparatus includes: a sensor acquisition unit that collects sensor information about the surroundings of a vehicle; a feature point extraction unit that extracts a feature point of an object; a target point detection unit that expresses the position of the feature point with spatial coordinates and detects it as a target point; a road edge presumption unit that presumes a segment between the target points, which are continuously aligned, as a road edge; and a blockade judgment unit that judges whether or not to cancel the road edge, on the basis of information about an area behind the presumed road edge, which is obtained from the sensor information, where the area behind the road edge is an area opposite the sensor at the other side of the presumed road edge.

6 Claims, 7 Drawing Sheets

(58) Field of Classification Search
CPC ....... G01S 2013/9315; G01S 2013/932; G01S 19/50; G01S 2013/93271; G01S 2013/93272; G01S 2007/4975; G01S 13/867; G01S 13/865; G01S 17/894; G01S 15/57; G01S 17/50; G01S 17/93; G01C 21/3602; G01C 21/32; G01D 21/02; G08G 1/166; G08G 1/161; G08G 1/167; G08G 1/163; G08G 1/165; G08G 1/164; G08G 1/096783; G08G 1/096775; G08G 1/096716; G08G 1/096741; G08G 1/133; G08G 1/16; G08G 1/20; G05D 2201/0213; G05D 1/0274; G05D 1/0246; G05D 1/027; G05D 1/0257; G05D 1/0221; G05D 1/0289; G05D 1/0234; G05D 1/0088; B60W 30/16; B60W 40/06; B60W 50/14; B60W 2050/0071; B60W 2050/0073; B60W 30/02; B60W 30/09; B60W 2420/403; B60W 2420/42; B60W 30/08; B60W 2554/80; B60W 30/12; B60W 30/18163; B60W 2554/4029; B60W 30/10; B60W 60/00274; B60T 2201/022; B60T 8/17558; B60T 2201/03; B60T 2201/08; B60T 2201/089; B60T 2210/32; B60T 2250/03; B60T 2270/30; B60T 8/246; B60T 2201/024; B60T 2250/04; G06N 20/10; G06N 3/04; G06N 3/08; G06N 3/0454; G06N 3/088; G06N 20/00; G06N 5/045; H04W 4/40; H04W 4/027; H04W 4/38; H04W 4/70; H04W 16/28; G06T 2207/20076; G06T 2207/30256; G06T 7/13

See application file for complete search history.

(56) References Cited

U.S. PATENT DOCUMENTS

| | | | |
|---|---|---|---|
| 2011/0044507 A1* | 2/2011 | Strauss | G01S 13/867 |
| | | | 382/103 |
| 2012/0213412 A1* | 8/2012 | Murashita | G06T 7/50 |
| | | | 382/104 |
| 2015/0063648 A1* | 3/2015 | Minemura | G06K 9/6217 |
| | | | 382/104 |
| 2016/0185346 A1 | 6/2016 | Awamori et al. | |

* cited by examiner

ARITHMETIC APPARATUS

CROSS-REFERENCE TO RELATED APPLICATION

This application claims priority to Japanese Patent Application No. 2019-014740, filed Jan. 30, 2019, the disclosure of which is incorporated herein by reference in its entirety.

TECHNICAL FIELD

The present invention relates to an arithmetic apparatus.

BACKGROUND ART

Technology that detects a road edge(s) such as a wall(s) where a vehicle cannot run by using information collected by a sensor(s) for the purpose of attention reminder for drivers or automatic driving has been being developed. It would be ideal if the detailed information of a wall surface could be obtained by the sensor; however, sufficient information cannot sometimes be obtained depending on the sensor's spatial resolution or the positional relationship between the wall surface and the sensor. PTL 1 discloses a mine machine including: a traveling apparatus capable of running on tracks of a mine; a car body supported by the traveling apparatus; a noncontact sensor which is provided at a front part of the car body and is capable of detecting an object(s) in a detection area in a noncontact manner, wherein the track in front of the car body and side edges of the track are located in the detection area while the traveling apparatus is traveling; an obstacle detection unit that detects an obstacle(s) on the track in front of the car body on the basis of an output signal of the noncontact sensor; a distance detection unit that detects a distance to a wall part beside the track on the basis of the output signal of the noncontact sensor; and a traveling control unit that controls the traveling apparatus on the basis of a detection result of at least one of the obstacle detection unit and the distance detection unit.

CITATION LIST

Patent Literature

PTL 1: WO2015/102096

SUMMARY OF THE INVENTION

Problems to be Solved by the Invention

The invention described in PTL 1 can be improved in a case when sufficient information about the wall surface cannot be obtained.

Means to Solve the Problems

An arithmetic apparatus according to a first aspect of the present invention includes: a sensor information acquisition unit that acquires sensor information from a sensor which is mounted in a vehicle and collects information about surroundings of the vehicle as the sensor information; a feature point extraction unit that extracts feature points of an object by using the sensor information; a target point detection unit that expresses positions of the feature points extracted by the feature point extraction unit with spatial coordinates and detects them as target points; a road edge presumption unit that presumes a segment between the target points, which are continuously aligned, as a road edge; and a blockade judgment unit that judges whether or not to cancel the road edge presumed by the road edge presumption unit, on the basis of information about an area behind the presumed road edge, which is obtained from the sensor information, wherein the area behind the road edge is an area opposite is an area opposite the sensor at the other side of the presumed road edge.

Advantageous Effects of the Invention

Whether the presumed road edge is true or false can be determined in a simplified manner according to the present invention when sufficient information about the wall surface cannot be obtained.

DESCRIPTION OF EMBODIMENTS

Embodiments

Embodiments of an arithmetic apparatus will be explained with reference to FIG. 1 to FIG. 9.

(Hardware Configuration)

Figure 1:
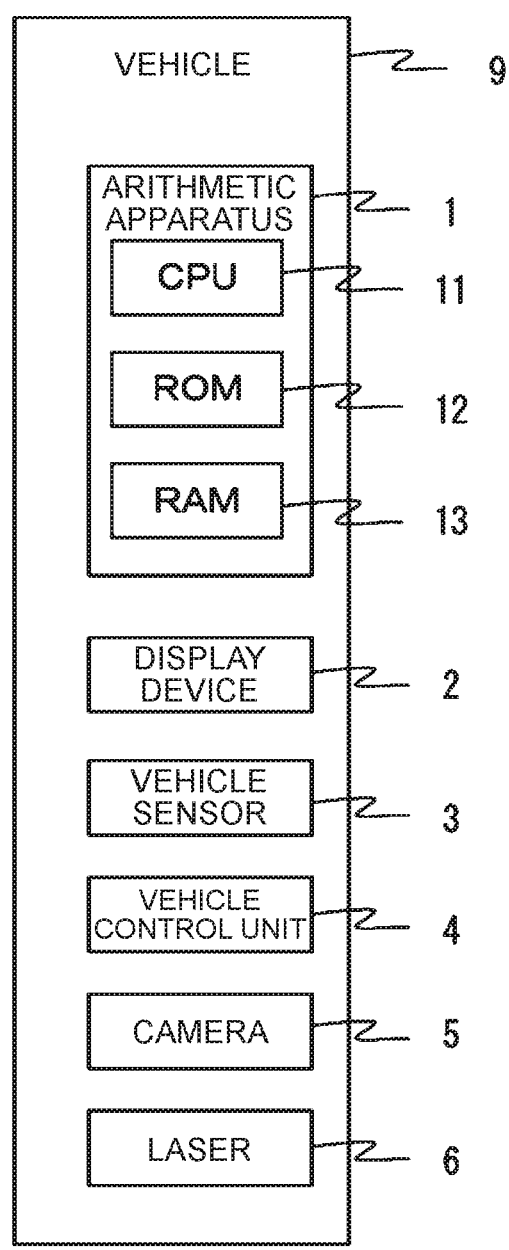
FIG. 1 is a hardware configuration diagram of a vehicle 9.

FIG. 1 is a hardware configuration diagram of a vehicle 9 in which an arithmetic apparatus 1 is mounted. The vehicle 9 includes the arithmetic apparatus 1, a display device 2, a vehicle sensor 3, a vehicle control unit 4, a camera 5, and a laser 6. Incidentally, the vehicle 9 will be hereinafter sometimes referred to as the "driver's own vehicle" 9 in order to distinguish it from other vehicles.

The arithmetic apparatus 1: includes a CPU 11 which is a central processing unit, a ROM 12 which is a read-only storage device, and a RAM 13 which is a readable/writable storage device; and implements a plurality of functions described later by the CPU 11 expanding and executing programs, which are stored in the ROM 12, on the RAM 13. The arithmetic apparatus 1 presumes walls existing around the vehicle 9 by using outputs from the camera 5 and the laser 6 and outputs the existence of the walls to the display device 2 and the vehicle control unit 4.

However, the arithmetic apparatus 1 may be implemented by an FPGA (Field ProgrAmmAble GAte ArrAy) which is a rewritable logical circuit or an ASIC (ApplicAtion Specific IntegrAted Circuit) which is an integrated circuit for specified usage, instead of the combination of the CPU 11, the ROM 12, and the RAM 13. Furthermore, the arithmetic apparatus 1 may be implemented by a combination with a different configuration such as a combination of the CPU 11, the ROM 12, the RAM 13, and the FPGA instead of the combination of the CPU 11, the ROM 12, and the RAM 13.

The display device 2 is, for example, a liquid crystal display and displays pictures based on operating commands of the arithmetic apparatus 1. The vehicle sensor 3 is a sensor for measuring the operations of the vehicle 9 and includes, for example, a speedometer for measuring the speed of the vehicle 9 and an angle meter for measuring a rotation angle of a steering wheel. However, the vehicle sensor 3: may only be required to be capable of obtaining information which enables the calculation of the position and attitude of the vehicle 9; and may be configured of, for example, a receiver which configures a satellite navigation system such as a GPS, and a gyroscope for measuring an attitude angle. The vehicle sensor 3 outputs the information obtained by measurement to the arithmetic apparatus 1.

The vehicle control unit 4 controls power sources such as an engine and a motor, a braking system, and a steering gear of the vehicle 9. However, the vehicle control unit 4 may be operated effectively only when specifically indicated by a user; and the vehicle control unit 4 does not have to be included the vehicle 9. The vehicle control unit 4 controls the vehicle 9 based on the existence of a wall(s), which exists around the vehicle 9, by using outputs from the arithmetic apparatus 1.

The camera 5 outputs an image(s) obtained by photographing the surroundings of the vehicle 9 as a captured image(s) to the arithmetic apparatus 1. The laser 6 is a laser range finder and emits a laser light at least at a plurality of angles in a horizontal direction and outputs the distance to an obstacle at each angle as obstacle information to the arithmetic apparatus 1. Incidentally, the captured image(s) and the obstacle information will be hereinafter also referred to as the "sensor information."

(Functional Configuration)

Figure 2:
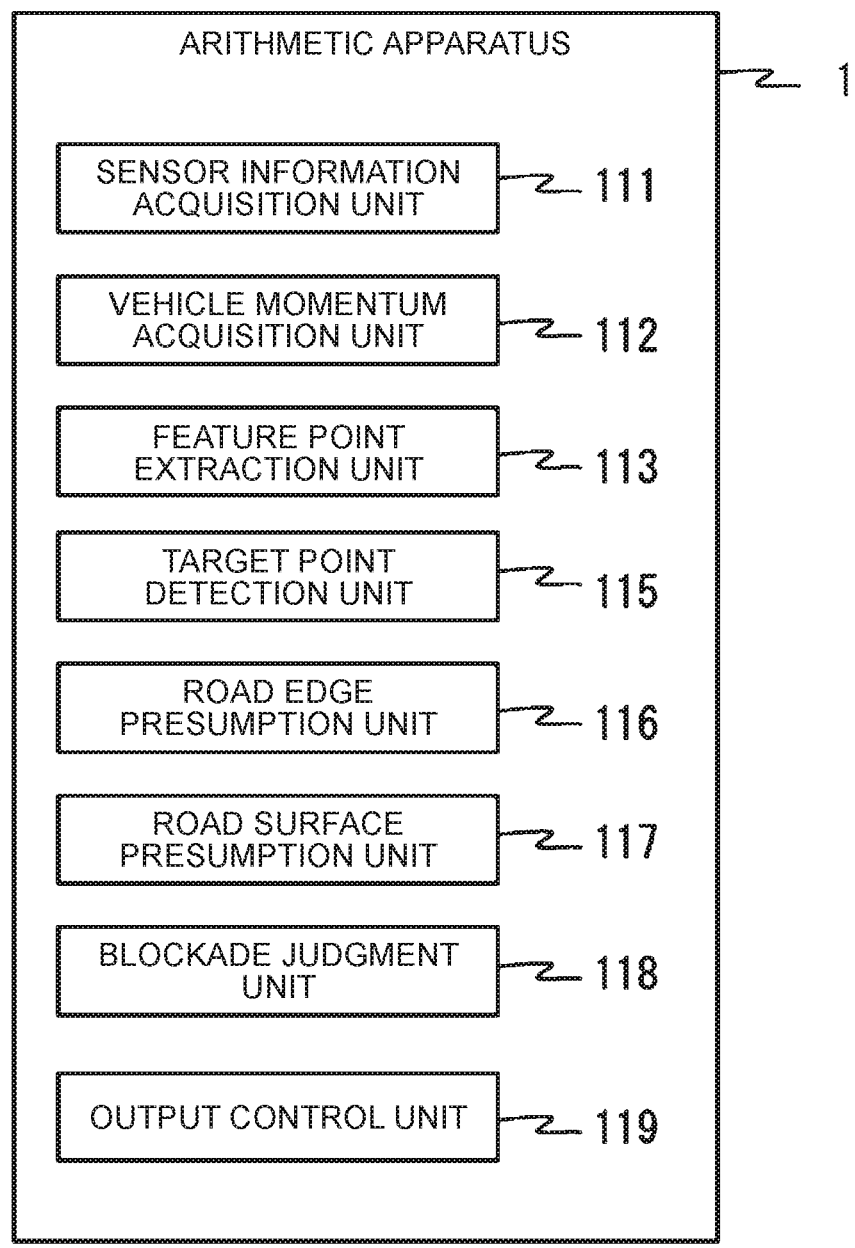
FIG. 2 is a functional configuration diagram of an arithmetic apparatus 1.

FIG. 2 is a functional configuration diagram of the arithmetic apparatus 1. The arithmetic apparatus 1 includes, as its functions, a sensor information acquisition unit 111, a vehicle momentum acquisition unit 112, a feature point extraction unit 113, a target point detection unit 115, a road edge presumption unit 116, a road surface presumption unit 117, a blockade judgment unit 118, and an output control unit 119.

The sensor information acquisition unit 111 acquires the sensor information from the camera 5 and the laser 6. The main sensor information of the camera 5 is camera images captured by photographing the scenery in front of the camera. The laser 6 acquires laser information, which is obtained by collecting the position and reflection intensity of an object(s) existing in a laser light emission direction from the reflection of the laser light emitted to the surroundings, as its main sensor information. The vehicle momentum acquisition unit 112 acquires information of the speed and steering angle of the vehicle from the vehicle sensor 3. Specifically, the vehicle momentum acquisition unit 112 can identify a traveling trajectory of the driver's own vehicle 9 and the position and attitude of the driver's own vehicle 9 at each time of day. The vehicle momentum acquisition unit 112 saves the position and attitude of the driver's own vehicle 9 in a storage area which is not illustrated in the drawing so that they can be checked against the sensor information. For example, if a time stamp is included in the sensor information, the vehicle momentum acquisition unit 112 records the position and attitude of the driver's own vehicle 9 together with the time-of-day information. Furthermore, if a serial number indicating the acquisition timing is included in the sensor information, the position and attitude of the driver's own vehicle 9 and the serial number are recorded together with the time-of-day information.

The feature point extraction unit 113 extracts feature points from images captured by the camera 5. The feature point(s) is a characteristic part(s) in an image and is, for example, a corner point of an object which appears in an image. Furthermore, the feature point(s) can be identified to a certain degree depending on its characteristics. For example, regarding the corner point(s), the direction of the corner and its outline strength become identifiers of that feature point. For example, the Harris operator which is a known technique can be applied to the feature point extraction unit 113. However, the feature point extraction unit 113 may use the obstacle information, which is output from the laser 6, directly as the feature point(s).

The target point detection unit 115 identifies the spatial coordinates of a feature point(s) extracted by the feature point extraction unit 113 and detects it as a target point. Regarding a movement of the camera 5 or the laser 6 belonging to the driver's own vehicle 9, a movement of the feature point extracted from the images captured by the camera 5 or the laser information of the laser 6 is determined by its spatial coordinates. So, the target point detection unit 115: derives the spatial coordinates of the relevant feature point by referring to a travel amount of the driver's own vehicle 9, which is acquired from the vehicle sensor 3, and tracking the movement of the feature point extracted by the feature point extraction unit 113; and outputs the feature point, to which this coordinate information is assigned, as the target point. Incidentally, the laser 6 can acquire the spatial coordinates of the object as the sensor information, so this may be used as the spatial coordinates to be assigned to the target point. Under these circumstances, the target point detection unit 115 defines a spatial coordinate system by setting, for example, the center position of the vehicle 9 at certain time of day as its origin, the north as a Y-axis, the east as an X-axis, and a vertical upward direction as a Z-axis. Then, every time the feature point extraction unit 113 extracts a feature point, the coordinates of that feature point in the spatial coordinate system are identified according to the position and attitude of the vehicle 9 acquired by the sensor information acquisition unit 111.

The road edge presumption unit 116 presumes a road edge by using target points detected by the target point detection unit 115. The road edge presumption unit 116 presumes a segment(s) between a plurality of target points, which are continuously aligned in the spatial coordinate system, as the road edge. Not only when the plurality of the target points are aligned along a straight line, but also even when the target points are a specified distance away from the straight line, the road edge presumption unit 116 presumes the segment(s) between these target points as the road edge. Incidentally, the specified distance may be a fixed value or a variable value. In a case of the variable value, for example, it may be set according to the resolving power of the sensor. Furthermore, even if the distance between the target points is wider than the width of the vehicle 9, the segment between these target points may be presumed as the road edge. Incidentally, the road edge presumption result by the road edge presumption unit 116 may sometimes be reversed by the blockade judgment unit 118 and its detailed explanation will be provided later.

The road surface presumption unit 117 presumes a road surface area by using the sensor information. For example, colors, patterns, shapes, and a light reflection factor can be used for the presumption of the road surface area. The road surface presumption unit 117 may presume an area which matches a specified color and/or a specified pattern in an image captured by the camera 5, as the road surface. The road surface presumption unit 117 may presume an area which has substantially the same height as that of a bottom face of a tire of the vehicle 9 and extends in a horizontal direction, as the road surface on the basis of height information of the target point. When a reflection factor of the laser is included in the sensor information which is output from the laser 6, the road surface presumption unit 117 may presume an area within a specified range of the reflection factor as the road surface.

The blockade judgment unit 118 judges whether blockade characteristics of the road edge presumed by the road edge presumption unit 116 are true or false. In other words, the blockade judgment unit 118 judges whether the segment between the target points, which is determined as the road edge by the road edge presumption unit 116, is truly blocked or not. The blockade judgment unit 118 judges the blockade of the road by three methods. The first method is a method to determine that the road is not blocked if another target point is detected in the back side of the presumed road edge. The second method is a method to determine that the road is not blocked if information of the plane of the presumed road edge changes along with the movement of the driver's own vehicle 9. The third method is a method to use the presumption result by the road surface presumption unit 117 and determine that the road is not blocked if both the front side and the back side of the presumed road edge are presumed as the road surface. The details of the three methods will be explained later in detail.

The output control unit 119 outputs the road edge information about the road edge presumed by the road edge presumption unit 116, regarding which the presumption result has not been reversed by the blockade judgment unit 118, to the display device 2 and the vehicle control unit 4. For example, even if the road edge presumption unit 116 presumes the existence of a certain road edge, the output control unit 119 does not output the road edge information if the blockade judgment unit 118 determines that such presumption is erroneous.

(Operation Example of Road Edge Presumption Unit 116)

Figure 3:
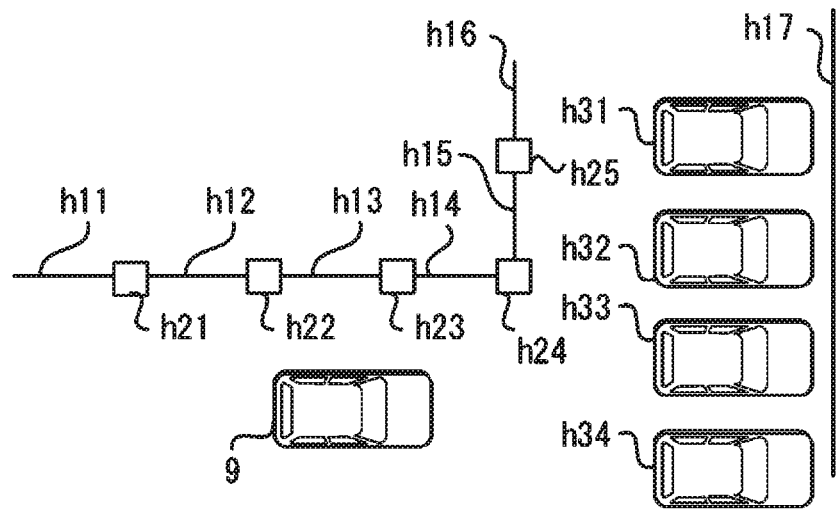
FIG. 3 is a diagram of a parking facility where the vehicle 9 is running, as viewed from above.
Figure 4:
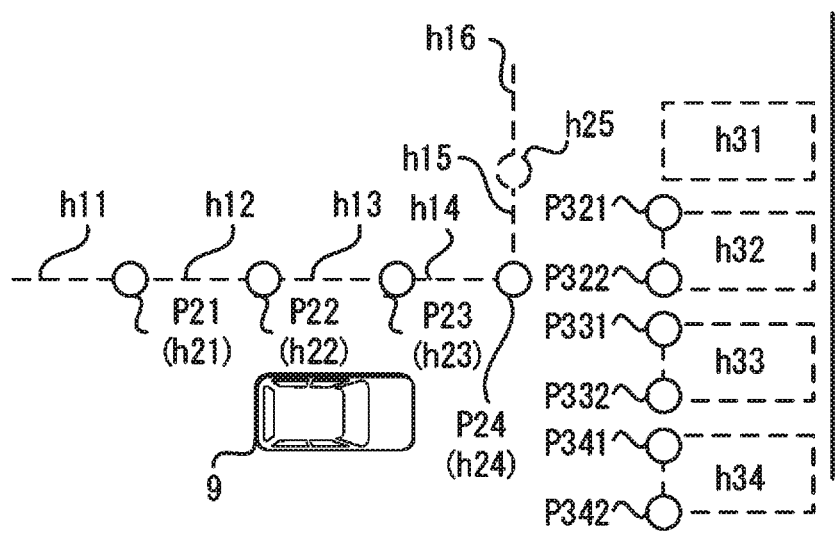
FIG. 4 is a diagram illustrating a target point recognition result by the arithmetic apparatus 1.
Figure 5:
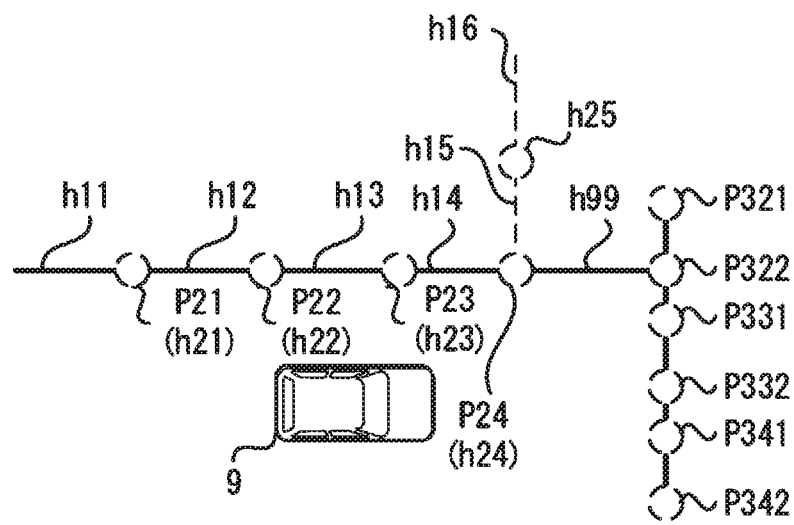
FIG. 5 is a diagram illustrating a road edge presumption result by a road edge presumption unit 116.

FIG. 3 to FIG. 5 are schematic diagrams illustrating the operation of the road edge presumption unit 116. FIG. 3 is a diagram of a parking facility where the driver's own vehicle 9 is running, as viewed from above; FIG. 4 is the target point recognition result by the arithmetic apparatus 1; and FIG. 5 is the road edge presumption result by the road edge presumption unit 116.

Walls h11 to h17, pillars h21 to h25, and vehicles h31 to h34 exist in the parking facility illustrated in FIG. 3. Incidentally, the pillars h21 to h25 are illustrated to be relatively large in order to emphasize their existence. The walls h11 to h17 are uniform walls without any asperities or patterns. The walls h11 to h14 are aligned along a straight line, which turns at the pillar 24 at an angle of 90 degrees and then the wall h15 and the wall h16 exist. The driver's own vehicle 9 exists in the center of the lower part of FIG. 3 and travels to the right direction in the drawing. The wall h17 exists ahead of the driver's own vehicle 9 and the vehicles h31 to h34 are parked side by side in front of that wall h17 and with their front parts facing the wall h17. Incidentally, the right side face of the vehicle h32 is located almost along an extension line from the walls h11 to h14. Incidentally, the "wall" will be hereinafter used as having the same meaning as the "road edge."

The respective circles illustrated in FIG. 4 are target points detected by the target point detection unit 115. Incidentally, in FIG. 4, broken lines are used to indicate objects other than the target points in order to show the correspondence with FIG. 3. Furthermore, a plurality of target points can be detected from each pillar h21 to h24, but an explanation will be provided here by assuming, for the purpose of simple explanation, that one target point is detected from each pillar. The target points P21 to P24 correspond to the pillars h21 to h24, respectively.

Since the pillar h25 and the vehicle h31 cannot be recognized from the driver's own vehicle 9 due to the existence of, for example, the wall h14, they are indicated with broken lines. Regarding the vehicles h32 to h34, at least both widthwise ends of the rear parts of the vehicles are recognized as target points. Specifically speaking, target points P321 and P322 are recognized for the vehicle h32, target points P331 and P332 are recognized for the vehicle h33, and target points P341 and P342 are recognized for the vehicle h34.

Referring to FIG. 5, the road edge presumption result by the road edge presumption unit 116 is indicated with bold lines and broken lines indicate the correspondence with FIG. 3 and FIG. 4. All the target points are indicated with the broken lines. When the road edge presumption unit 116 detects the plurality of target points which are continuously aligned, it presumes segments between these target points as road edges. Therefore, not only the segments between the target points P21 to P24 are presumed as the road edges, but also the segment between the target points P24 and P322 which are accidentally aligned along a straight line is also presumed as the road edge h99. Specifically speaking, the presumed road edge h99 is a road edge which does not actually exist, and this presumption will be canceled by the processing of the blockade judgment unit 118 described later.

(Operation of Blockade Judgment Unit 118)

The three methods for estimating whether the road edge presumed by the blockade judgment unit 118 is true or false will be explained with reference to the relevant drawings. Incidentally, every method uses information about an area behind the road edge.

Regarding the first method, the blockade judgment unit 118 determines that the relevant road edge is not blocked, that is, the presumption by the road edge presumption unit 116 is erroneous if a target point exists behind the road edge presumed by the road edge presumption unit 116. Incidentally, the area behind the road edge is an area is opposite the camera 5 and the laser 6 at the other side of the presumed road edge. Furthermore, "behind the road edge" can be also expressed as "the back side of the road edge." Since the vehicle momentum acquisition unit 112 saves the position and attitude of the driver's own vehicle 9 so that they can be checked against the sensor information as described earlier, the blockade judgment unit 118 can identify the position of the vehicle 9 when each target point is acquired, that is, the positions of the camera 5 and the laser 6.

Figure 6:
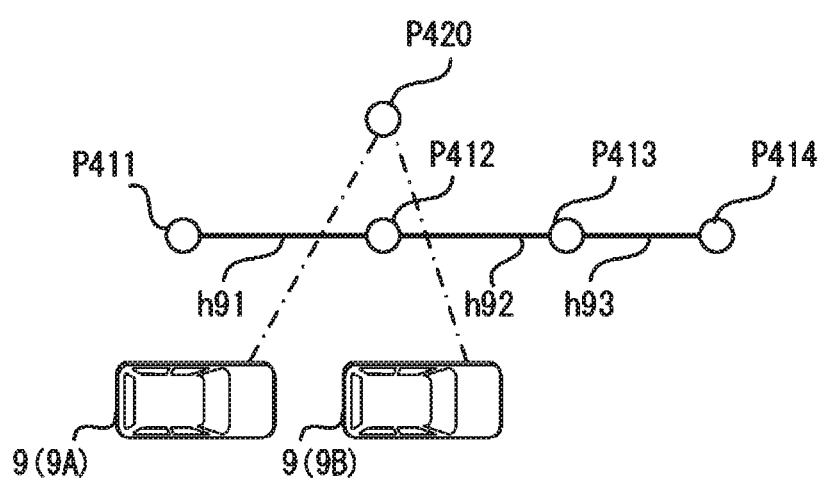
FIG. 6 is a schematic diagram for explaining a first method of a blockade judgment unit 118.

FIG. 6 is a schematic diagram for explaining the first method of the blockade judgment unit 118. Referring to FIG. 6, circles represent target points detected by the target point detection unit 115, bold lines represent road edges presumed by the road edge presumption unit 116, and long dashed short dashed lines represent auxiliary lines for explanation. The vehicle 9 is running in the lower part of the drawing and was located at position 9A at a certain time of day and at position 9B at another time of day. A case where target points P411 to P414 and P420 are detected by the target point detection unit 115 and the road edge presumption unit 116 presumes h91 to h93 as road edges is assumed.

In this case, since the target point P420 exists behind the road edges presumed by the road edge presumption unit 116, the blockade judgment unit 118 determines that the presumption of the road edges by the road edge presumption unit 116 is erroneous. If the blockade judgment unit 118 determines based on the sensor information obtained when the vehicle 9 is located at the position 9A that the target point P420 is detected, it determines that the presumption of the road edge h91, which is the road edge intersecting with a straight line connecting the positions of the camera 5 and the laser 6 at that time and the target point P420, is erroneous. Furthermore, if the blockade judgment unit 118 determines based on the sensor information obtained when the vehicle 9 is located at the position 9B that the target point P420 is detected, it determines that the presumption of the road edge h92 is erroneous.

Incidentally, the auxiliary line extends from the left-side face of the vehicle 9 in FIG. 6 because it is assumed that the camera 5 and the laser 6 for acquiring the information of the left side of the vehicle 9 are mounted on the left side of the vehicle 9. If the camera 5 and the laser 6 were mounted on the front side of the vehicle 9, the auxiliary line would extend from the front side of the vehicle 9.

Figure 7:
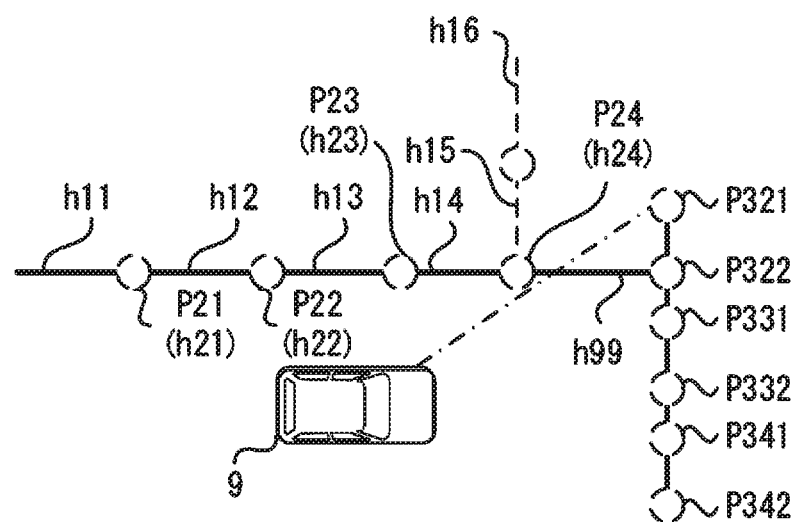
FIG. 7 is a diagram illustrating the result obtained by applying the first method of the blockade judgment unit 118 to the road edge presumption result by the road edge presumption unit 116 illustrated in FIG. 5.

FIG. 7 is a diagram illustrating the result obtained by applying the first method of the blockade judgment unit 118 to the road edge presumption result by the road edge presumption unit 116 illustrated in FIG. 5. In the examples illustrated in FIG. 3 to FIG. 5, the target point P321 is detected and the target point P321 exists in the back side of the road edge h99 presumed by the road edge presumption unit 116. FIG. 7 shows that a line segment connecting the vehicle 9 and the target point P321 intersects with the road edge h99. Therefore, the blockade judgment unit 118 determines that the presumption regarding the road edge h99 by the road edge presumption unit 116 is erroneous. The first method has been explained above.

Regarding the second method, the blockade judgment unit 118: calculates a change in the sensor information based on the movement of the vehicle 9 by assuming that the road edge presumed by the road edge presumption unit 116 is a plane which stands perpendicularly to the road surface; and judges whether the road edge presumed by the road edge presumption unit 116 is true or false, on the basis of deviation from a change in the sensor information which is actually obtained. For example, an image of the plane area of the presumed road edge in the captured image obtained before the movement of the vehicle 9 is set as a processing target and an image of that road edge area obtained at the position after the movement is calculated based on the positional relationship and attitude relationship with the vehicle 9 after the movement. Then, the blockade judgment unit 118 compares the calculated image with the actually obtained captured image; and if the deviation between them exceeds a specified threshold value, the blockade judgment unit 118 determines that the presumed road edge is false, that is, the presumption of that road edge is erroneous.

Regarding the third method, the blockade judgment unit 118 uses the presumption result by the road surface presumption unit 117. If both the front side and the back side of the presumed road edge are presumed as the road surface by the road surface presumption unit 117, the blockade judgment unit 118 determines that the road edge is not blocked.

Figure 8:
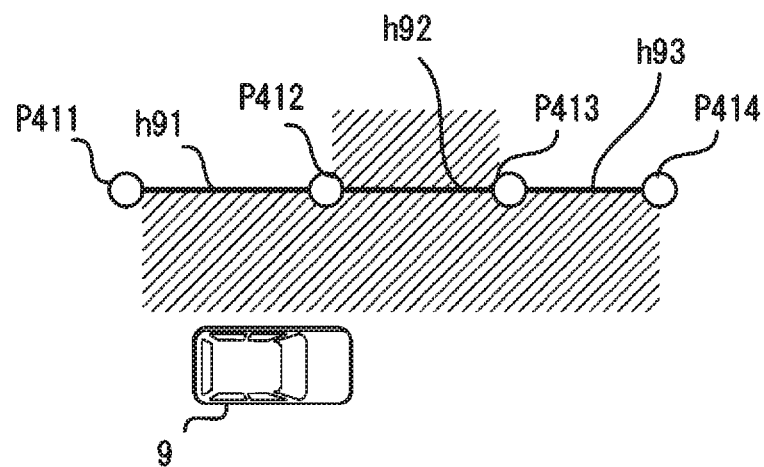
FIG. 8 is a schematic diagram for explaining a third method of the blockade judgment unit 118.

FIG. 8 is a schematic diagram for explaining the third method of the blockade judgment unit 118. Since the reference numerals indicated in FIG. 8 are the same as those in FIG. 6, an explanation about them has been omitted. However, hatching in FIG. 8 indicates an area presumed as the road surface by the road surface presumption unit 117. In this case, since the front side and the back side of the presumed road edge h92 are presumed as the road surface by the road surface presumption unit 117, the blockade judgment unit 118 determines that the presumed road edge h92 is not blocked, that is, the presumption by the road surface presumption unit 117 is erroneous.

(Flowchart)

Figure 9:
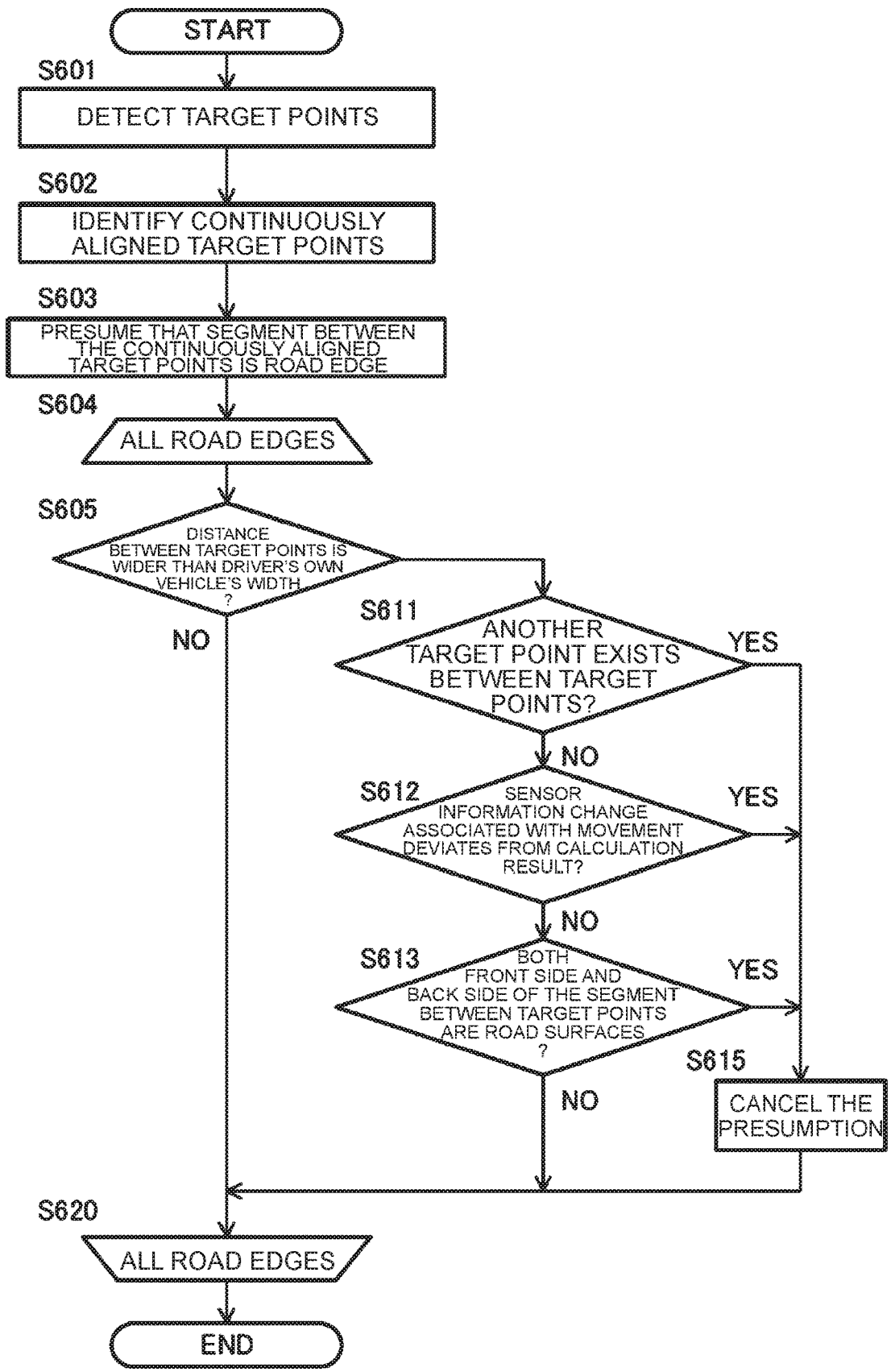
FIG. 9 is a flowchart illustrating road edge estimation processing by the arithmetic apparatus 1.

FIG. 9 is a flowchart illustrating the road edge estimation processing by the arithmetic apparatus 1. This processing is always executed repeatedly in a scene where the road edge is estimated. A subject of each step explained below is the CPU 11.

In S601, the arithmetic apparatus 1 firstly has the sensor information acquisition unit 111 acquire the sensor information. Specifically speaking, the camera 5 captures camera images and the laser 6 acquires the laser information. Then, the feature point extraction unit 113 is used to extract feature points from these camera images and the laser information. Subsequently, the target point detection unit 115 is used to derive the spatial coordinates of the feature points and detects target points. Then, the road edge presumption unit 116: identifies the target points which are aligned continuously in the three-dimensional space or in the two-dimensional plane without heights (S602); and presumes segments between the identified target points as a road edge(s) (S603). The arithmetic apparatus 1 executes the processing from S605 to S615 by setting all the segments between the target points presumed as the road edges in S603 and switching the processing target one by one. For example, in the example of FIG. 5, the arithmetic apparatus 1 sets the road edge h11 as the processing target for the first time and executes the processing of S605 to S615 and then sets the road edge h12 as the processing target and executes the processing of S605 to S615, and then sets all nine road edges as the processing targets in the same manner.

In S605, the arithmetic apparatus 1 judges whether the segment between the target points, which is the processing target, is wider than the width of the driver's own vehicle 9; and if the arithmetic apparatus 1 determines that the segment is wider than the width of the driver's own vehicle 9, the processing proceeds to S611; and if the arithmetic apparatus 1 determines that the width of the segment is equal to or less than the width of the driver's own vehicle 9, the processing proceeds to S620. In S611, the arithmetic apparatus 1 judges whether another target point exists in the back side of the segment between the target points; and if the arithmetic apparatus 1 determines that another target point exists, the processing proceeds to S615; and if the arithmetic apparatus 1 determines that another target point does not exist, the processing proceeds to S612. In S612, the arithmetic apparatus 1 assumes that the presumed road edge is a plane perpendicular to the road surface and recognizes that any object appearing in this road edge direction from among the sensor information is located on this plane, and thereby calculates the sensor information after the movement of the vehicle 9 on the basis of the vehicle travel amount. The arithmetic apparatus 1 evaluates deviation between the above calculation result and the actual sensor information. If there is any deviation, it means that the sensor information in this road edge direction is not located on the plane of the road edge. If the arithmetic apparatus 1 determines that the deviation between them is more than a threshold value, the processing proceeds to S615; and if the arithmetic apparatus 1 determines that the deviation between them is equal to or less than the threshold value, the processing proceeds to S613.

In S613, the arithmetic apparatus 1 uses the presumption result by the road surface presumption unit 117 and judges whether both the front side and the back side of the segment between the target points, which is the processing target, are presumed as the road surface or not. If the arithmetic apparatus 1 determines that both of them are presumed as the road surface, the processing proceeds to S615; and if the arithmetic apparatus 1 determines that at least either one of them is not presumed as the road surface, the processing proceeds to S620. In S615, the blockade judgment unit 118 cancels the presumption of the segment between the target points, which is the processing target, as the road edge by the road edge presumption unit 116 and proceeds to S620. Incidentally, S611, S612, and S613 correspond to the first method, the second method, and the third method of the blockade judgment unit 118, respectively.

In S620, the arithmetic apparatus 1 judges whether all the segments between the target points, which were presumed as the road edges in S603, have become the processing targets for S605 to S615. If the arithmetic apparatus 1 determines that there are unprocessed segments between the target points, it sets any one of the unprocessed segments between the target points as the processing target and returns to S605; and if the arithmetic apparatus 1 determines that all the segments between the target points have become the processing targets, it terminates the processing illustrated in FIG. 9.

The following operational advantages can be obtained according to the above-described embodiment.

(1) The arithmetic apparatus 1 includes: the sensor information acquisition unit 111 that acquires the sensor information from the camera 5 and the laser 6 which are mounted in the vehicle 9 and collects information about the surroundings of the vehicle 9 as the sensor information; the feature point extraction unit 113 that extracts a feature point(s) of an object(s) by using the sensor information; the target point detection unit 115 that expresses the position(s) of the feature point(s) extracted by the feature point extraction unit 113 with spatial coordinates and detects it/them as a target point(s); the road edge presumption unit 116 that presumes a segment between the target points, which are continuously aligned, as a road edge; and the blockade judgment unit 118 that judges whether or not to cancel the road edge presumed by the road edge presumption unit 116, on the basis of information about an area behind the presumed road edge, which is obtained from the sensor information. The area behind the road edge is an area opposite the sensor at the other side of the presumed road edge. Therefore, when sufficient information about the wall surface cannot be obtained, whether the presumed road edge is true or false can be judged in a simplified manner.

(2) The blockade judgment unit 118 determines, according to the first method, to cancel the presumed road edge when a target point(s) exist in the area behind the presumed road edge. Therefore, the presumption by the road edge presumption unit 116 can be evaluated by using the positional relationship between the target points and the vehicle.

(3) The blockade judgment unit 118 determines an area from the road edge presumed by the road edge presumption unit 116, such as the road edge h99 as illustrated in FIG. 7, to the target points such as the target point P321 in the area behind the presumed road edge as a travelable area. Therefore, the blockade judgment unit 118 not only judges whether the road edge exists or not, but also outputs information about the area where the vehicle 9 can travel, so that it can contribute to the control of the vehicle 9 and the provision of information to the driver.

(4) The arithmetic apparatus 1 includes the vehicle momentum acquisition unit 112 which acquires the moving direction and distance of the vehicle 9 as the vehicle travel amount. According to the second method, the blockade judgment unit 118 assumes that the presumed road edge is a plane perpendicular to a road surface; recognizes that an object which appears in a direction of the road edge from among the sensor information is located on that plane; and judges whether the road edge presumed by the road edge presumption unit is true or false, on the basis of the sensor information on the plane after the vehicle has moved, which is calculated based on the vehicle travel amount, and the sensor information which is actually obtained. Therefore, even if any feature point cannot be obtained, it is possible to judge whether or not to cancel the road edge.

(5) The arithmetic apparatus 1 includes the road surface presumption unit 117 which presumes the position of the road surface, on which the vehicle 9 can run, around the vehicle on the basis of the sensor information. When the front side and the back side of the road edge presumed by the road edge presumption unit 116 are presumed as the road surface by the road surface presumption unit 117, the blockade judgment unit 118 determines to cancel the presumed road edge. Consequently, whether the road edge is true or false can be judged by using the road surface presumption technology.

Variation 1

In the aforementioned embodiment, the blockade judgment unit 118 includes the first, second, and third methods. However, the blockade judgment unit 118 may only be required to include at least any one of the above-mentioned methods.

Variation 2

If the presumption by the road edge presumption unit 116 is denied by any one of the first to third methods as indicated in S611 to S613 in FIG. 9, the blockade judgment unit 118 cancels the presumption by the road edge presumption unit 116. However, the presumption by the road edge presumption unit 116 may be canceled only if the presumption by the road edge presumption unit 116 is denied by the two or more methods.

Variation 3

If the captured image which is output from the camera 5 before the movement of the vehicle 9 does not match the captured image after the movement of the vehicle 9, the blockade judgment unit 118 may determine according to the second method that the road edge presumed by the road edge presumption unit 116 is false, that, the presumed road edge is not a true road edge. This is because it can be presumed that, for example, if images of a uniform wall without any patterns are captured from different angles, similar pictures would be obtained.

The following operational advantage can be obtained according to this variation.

(6) The blockade judgment unit 118: assumes that the presumed road edge is a plane perpendicular to a road surface; recognizes that an image in a direction of the plane from among the captured images exists at spatial coordinates on the plane; calculates the image on the plane after the vehicle has moved on the basis of the vehicle travel amount; and judges whether or not to cancel the presumed road edge, on the basis of the above-mentioned image and a captured images actually photographed after the vehicle has moved regarding before and after the movement of the vehicle. Therefore, the blockade judgment unit 118 can judge whether the presumed road edge is true or false in a simplified manner.

Variation 4

In the aforementioned embodiment, no consideration is given to a height direction by the first method of the blockade judgment unit 118. However, the blockade judgment unit 118 may consider the height direction by the first method. In this case, the road edge presumption unit 116 firstly estimates the height of the road edge by a known method. Then, the blockade judgment unit 118 judges whether or not a straight line connecting the sensor mounted in the vehicle 9 and a target point existing at the back side of the presumed road edge intersects with the presumed road edge. If they intersect with each other, the blockade judgment unit 118 determines that the presumption by the road edge presumption unit 116 is erroneous; and if they do not intersect with each other, the blockade judgment unit 118 does not determine that the presumption by the road edge presumption unit 116 is erroneous.

Figure 10:
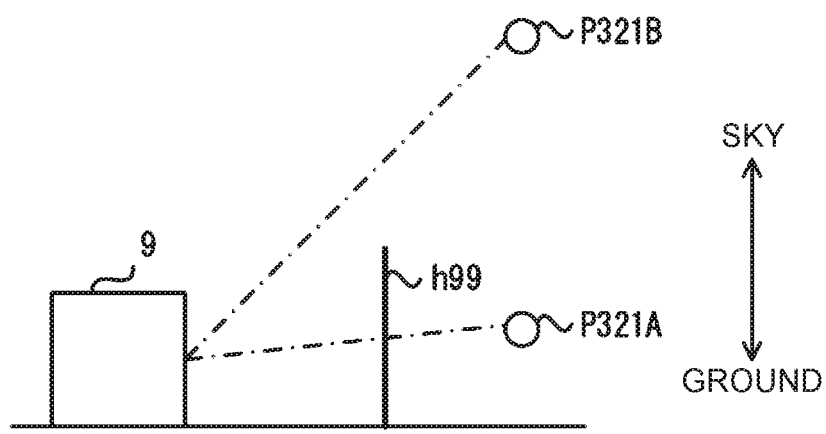
FIG. 10 is a diagram for explaining the first method in Variation 4.
Figure 11:
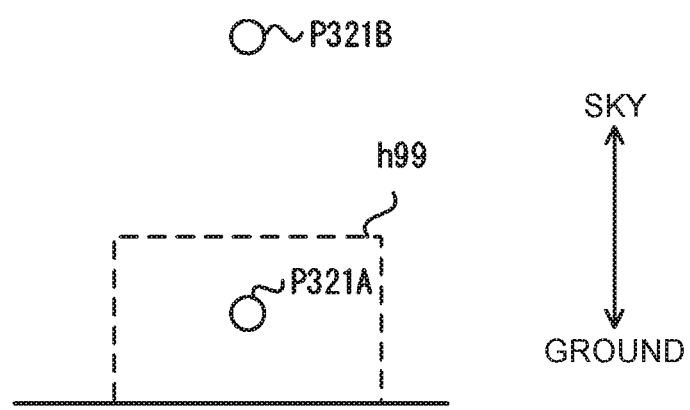
FIG. 11 is a diagram illustrating the same situation as that of FIG. 10 as viewed from a different angle from that of FIG. 10.

FIG. 10 and FIG. 11 are diagrams for explaining the first method of the blockade judgment unit 118 according to Variation 4. FIG. 10 is a diagram showing the situation in FIG. 7 according to the embodiment as viewed from the lateral side. If the target point P321 is located at the position indicated as P321A at a lower part of the diagram, a line segment connecting the target point P321 and the sensor intersects with the road edge h99 and, therefore, the presumption of the road edge h99 by the road edge presumption unit 116 is determined to be erroneous. If the target point P321 is located at the position indicated as P321B in an upper part of the diagram, a line segment connecting the target point P321 and the sensor does not intersect with the road edge h99 and, therefore, the presumption of the road edge h99 by the road edge presumption unit 116 is determined to be not erroneous.

FIG. 11 is a diagram showing the same situation as that of FIG. 10 as viewed from a different angle and corresponds to an image obtained by cutting off an area around the target point P321 from the image captured by the camera 5. When the camera 5 is used as the sensor as illustrated in FIG. 11, it may be only necessary to judge whether or not the area of the presumed road edge h99 overlaps the position of the target point P321 in the captured image.

Variation 5

The vehicle 9 may not include at least one of the display device 2 and the vehicle control unit 4. The vehicle 9 may not include at least one of the camera 5 and the laser 6. The vehicle 9 may include other sensors such as an ultrasonic sensor instead of the camera 5 and the laser 6.

The above-described respective embodiments and variations may be combined with each other. Various embodiments and variations have been explained above, but the present invention is not limited to the content of these embodiments and variations. Other aspects which can be thought of within the scope of the technical idea of the present invention are also included within the scope of the present invention.

REFERENCE SIGNS LIST

1: arithmetic apparatus
2: display device
3: vehicle sensor
4: vehicle control unit
5: camera
6: laser
9: vehicle
111: sensor information acquisition unit
112: vehicle momentum acquisition unit
113: feature point extraction unit
114: feature point tracking unit
115: target point detection unit
116: road edge presumption unit
117: road surface presumption unit
118: blockade judgment unit
119: output control unit

The invention claimed is:

1. An arithmetic apparatus comprising:
 a sensor information acquisition unit that acquires sensor information from a sensor which is mounted in a vehicle and collects information about surroundings of the vehicle as the sensor information to detect one or more stationary objects in surroundings of the vehicle;
 a feature point extraction unit that extracts feature points of a detected object by using the sensor information;
 a target point detection unit that expresses positions of the feature points extracted by the feature point extraction unit with spatial coordinates of a spatial coordinate system, which are function of a position of the vehicle, and detects them as target points;
 a road edge presumption unit that presumes a segment between the target points, which are continuously aligned in the spatial coordinate system as the vehicle moves, as a road edge; and
 a blockade judgment unit, including a processor that determines, whether or not to cancel the road edge presumed by the road edge presumption unit, on the basis of information about an area behind the presumed road edge, which is obtained from the sensor information, wherein the area behind the road edge is an area opposite to the sensor at the other side of the presumed road edge.

2. The arithmetic apparatus according to claim 1, wherein the blockade judgment unit determines to cancel the presumed road edge when the target point exists in the area behind the presumed road edge.

3. The arithmetic apparatus according to claim 1, wherein the blockade judgment unit determines an area as a travelable area, from the presumed road edge to the target point in the area behind the presumed road edge.

4. The arithmetic apparatus according to claim 1, further comprising a vehicle momentum acquisition unit that acquires a moving direction and distance of the vehicle as a vehicle travel amount, wherein the blockade judgment unit: assumes that the presumed road edge is a plane perpendicular to a road surface; recognizes that an object which appears in a direction of the road edge from the sensor information is located on the plane; and determines whether or not to cancel the road edge presumed by the road edge presumption unit, on the basis of the sensor information on the plane after the vehicle has moved, which is calculated based on the vehicle travel amount, and the sensor information.

5. The arithmetic apparatus according to claim 1, further comprising a vehicle momentum acquisition unit that acquires a moving direction and distance of the vehicle as a vehicle travel amount, wherein the sensor is a camera; wherein the sensor information is captured images obtained by the camera; and wherein the blockade judgment unit: assumes that the presumed road edge is a plane perpendicular to a road surface; recognizes that an image in a direction of the plane from the captured images exists at spatial coordinates on the plane; calculates the image on the plane after the vehicle has moved, on the basis of the vehicle travel amount; and determines whether or not to cancel the presumed road edge, on the basis of the above-calculated image and the captured images after the vehicle has moved.

6. The arithmetic apparatus according to claim 1, further comprising a road surface presumption unit that presumes a position of a road surface, on which the vehicle can move, around the vehicle on the basis of the sensor information, wherein the blockade judgment unit determines to cancel the presumed road edge when a front side and back side of the presumed road edge are presumed as the road surface by the road surface presumption unit.

* * * * *